United States Patent Office 3,053,776
Patented Sept. 11, 1962

3,053,776
RADIATION SHIELDING MATERIALS
Lyle B. Borst, Ossining, N.Y., assignor to The Dow Chemical Company, Midland, Mich., a corporation of Delaware
No Drawing. Filed Mar. 17, 1959, Ser. No. 800,048
11 Claims. (Cl. 252—478)

This invention concerns certain complex chemical compounds containing heavy metal elements, nitrogen and hydrogen for absorbing high energy radiations and pertains to the use of such materials for shielding nuclear or atomic reactors.

In the prior art, the problems of shielding devices such as nuclear reactors or atomic piles against escape of radiations resulting from radioactivity such as slow or fast neutrons or beta or gamma rays has been accomplished by various lead-containing materials, by the use of lead plate, large tanks of water, massive blocks of concrete usually in conjunction with one another or with compounds containing heavy elements and hydrogen such as hydrated ferric oxide. Such methods of shielding nuclear or atomic reactors have been reasonably satisfactory for permanent installations, i.e., non-mobile reactors or devices which remain at a fixed site.

More recently, however, there have been developed devices described as neutron reactors or atomic reactors of more compact design, wherein fissionable material such as $U^{235}$ or $Pu^{239}$ are caused to undergo a self-sustaining nuclear chain reaction which results in the evolution of great amounts of heat and other forms of energy, together with radioactive radiations comprising fast and slow neutrons and beta and gamma rays.

It is apparent that neutron or atomic reactors of compact design, and capable of producing great amounts of energy, principally in the form of heat, can be used to replace conventional solid or liquid fuels such as coal, oil or gasoline, usually employed in mobile units. e.g., locomotives, ships or airplanes.

However, the shielding of such neutron or atomic reactors against escape of radioactive radiations presents difficult problems. When attempt is made to provide adequate shielding in heretofore known ways and with usual materials such as lead plates, large tanks of water, or massive blocks of concrete, the weight or size of the shielding materials renders it impractical to provide adequate shielding of the reactor against the escape of radiations and produce an atomic reactor of a size suitable for use in a mobile unit such as a locomotive or an airplane.

It is a primary object of the invention to provide chemical compositions containing heavy elements, nitrogen and hydrogen which are effective shielding materials for preventing the escape of neutrons and high energy radiations from nuclear or atomic reactors. Another object is to provide shielding materials having a high shielding effectiveness per unit volume and a high capacity for absorbing such radiations. A further object is to provide a shielding material that can be incorporated with other materials or employed in conjunction with other shielding materials and fabricated into sheets, blocks, boxes or other forms having good mechanical strength and radiation resistance. Other and related objects will appear from the following description of the invention.

According to the invention, the foregoing and related objects are obtained by employing as radiation shielding materials complex chemical compounds comprised of nitrogen, hydrogen and trivalent cobalt or chromium, such as the perrhenates, the hexamino trihalides, e.g., the chlorides, bromides or iodides, of trivalent cobalt or chromium. Derivatives of the hexamino cobaltic or chromic trihalides or perrhenates wherein one or more, suitably one or two, of the ammonia ($NH_3$) group are replaced by a chlorine, bromine or iodine atom or an oxalate, sulfate, cyanide or nitro group, can also be used. Such compounds possess a high shielding effectiveness per unit weight of the material for the slowing down and capture of neutrons and radioactivity resulting from the capture of neutrons such as beta rays or gamma rays and gamma rays emanating from the reactor itself. By employing derivatives of the cobaltic or chromic perrhenates or hexamino trihalides in which one or more of the ammonia group are replaced by one or more of the aforementioned group or mixtures of any two or more of the above compounds, the heavy metal element, i.e., the cobalt or chromium, content of the compound can be controlled at the optimum concentration to obtain the desired shielding against radioactivity.

Examples of suitable radiation shielding materials of the invention are cobalt hexamine trichloride, cobalt hexamine tribromide, cobalt hexamine triiodide, cobalt hexamine perrhenate, chromium hexamine perrhenate, or cobalt chloropentamine trichloride.

The compounds can be employed as radiation shielding material alone, but are preferably employed in combination with other materials such as iron, lead, stainless steel, tantalum, and the like, which are necessary to meet the stringent shielding requirements of nuclear reactors for mobile units such as locomotives, ships or airplanes and to provide good structural strength.

In one embodiment the highly efficient shielding materials of the invention can be melted and cast as a layer of the same between sheets of lead, tantalum, iron or stainless steel, and allowed to harden to form a sandwich or composite sheet of great structural strength and of substantially lesser weight than is required for sheets of the metal alone having the same or similar shielding effectiveness against radioactivity. In another embodiment the cobaltic or chromic hexamino trihalides or perrhenates can be incorporated with other materials such as thermoset or thermoplastic resins to obtain a shielding material of considerable utility and structural strength. Such materials can be fabricated into sheets, panels, boxes or various other structures as may be desired.

The amount or proportion of the cobaltic or chromic containing shielding material to be employed will vary widely depending upon the nuclear reactor to be shielded, but can readily be controlled so that the proportion of the heavy element is substantially the concentration required for optimum shielding purposes.

Methods of calculating the gamma ray absorption coefficient and thermal neutron absorption per square centimeter or per unit weight for the materials of the invention are well known to those skilled in the art and need not be discussed here. The proportion or amount of the materials to be employed can readily be determined for a nuclear reactor of predetermined size and energy output.

The following example is illustrative of the effectiveness of the shielding materials of the invention for absorbing radioactive and high energy radiations, but it is not to be construed as limiting its scope.

*Example*

The thermal neutron cross section per square centimeter and the gamma ray absorption coefficient for the compounds cobaltic hexamine trichloride and cobaltic hexamine triiodide are reported in the following table. The table identifies the material by giving its chemical formula, its density and the hydrogen content in grams per cubic centimeter of the material. The table also gives the thermal neutron cross section and the gamma ray absorption coefficient for the materials. For purpose of comparison, the corresponding properties for water are included in the table.

| No. | Compound Formula | Density, gm./cc. | Hydrogen, gm./cc. | Thermal Neutron Cross Section, cm.²/cc. | Gamma Ray Absorption Coefficient cm.⁻¹ |
|---|---|---|---|---|---|
| 1 | Co(NH$_3$)$_6$Cl$_3$ | 1.7 | 0.115 | 0.571 | 0.113 |
| 2 | Co(NH$_3$)$_6$I$_3$ | 2.6 | 0.086 | 0.195 | 0.155 |
| 3 | H$_2$O | 1.0 | 0.110 | 0.020 | 0.070 |

As shown in the above table the cobalt hexamine trichloride and triiodide possess good thermal neutron cross section and gamma ray attenuation and are substantially more effective as shielding materials for such radioactivity than is water.

Similar properties are possessed by the compounds cobalt hexamine tribromide, cobalt hexamine perrhenate, chromium hexamine trichloride, chromium hexamine tribromide, chromium hexamine triiodide and chromium hexamine perrhenate.

I claim:

1. A shield for protecting an environment against high energy radiations from nuclear reactors, comprising a self-sustaining sheet consisting essentially of a complex inorganic chemical compound of the class consisting of the hexamine, trichlorides, tribromides, triiodides and perrhenates of trivalent cobalt and chromium and derivatives of such hexamine compounds having from one to two of the NH$_3$ groups replaced by a member of the group consisting of the sulfate, cyanide, nitro, oxalate, chloride, bromide and iodide radicals.

2. A shield as claimed in claim 1, wherein the complex inorganic compound is a hexamine compound of trivalent cobalt.

3. A shield as claimed in claim 1, wherein the complex inorganic compound is a hexamino compound of trivalent chromium.

4. A shield as claimed in claim 1, wherein the complex inorganic compound is cobalt hexamine trichloride.

5. A shield as claimed in claim 1, wherein the complex inorganic compound is cobalt hexamine triiodide.

6. A method of protecting an environment against high energy radiations from nuclear reactors which consists in interposing between the source of said radiation and the environment a shielding material consisiting essentially of a mass of a complex inorganic compound of the class consisting of the hexamine trichlorides, tribromides, triiodides and perrhenates of trivalent cobalt and chromium and derivatives of such hexamine compounds having from one to two of the NH$_3$ groups replaced by a member of the group consisting of the sulfate, cyanide, nitro, oxalate, chloride, bromide and iodide radicals.

7. A method as claimed in claim 6, wherein the inorganic compound is a hexamine compound of trivalent cobalt.

8. A method as claimed in claim 6, wherein the inorganic compound is a hexamino compound of trivalent chromium.

9. A method of protecting an environment against high energy radiations from nuclear reactors which consists in interposing between the source of said radiation and the environment a shielding material consisting essentially of a mass of cobalt hexamine trichloride.

10. A method of protecting an environment against high energy radiations from nuclear reactors which consists in interposing between the source of said radiations and the environment a shielding material consisting essentially of a mass of cobalt hexamine triiodide.

11. A method for reducing the intensity of high energy radiaions emanating from a nuclear reactor which consists in surrounding the nuclear reactor with a shielding material comprising a self-sustaining sheet consisting essentially of a mass of a complex inorganic compound selected from the group consisting of the hexamine trichlorides, tribromides, triiodides and perrhenates of trivalent cobalt and chromium and derivatives of such hexamine compounds having from one to two of the NH$_3$ groups replaced by a member of the group consisting of the sulfate, cyanide, nitro, oxalate, chloride, bromide and iodide radicals.

References Cited in the file of this patent

UNITED STATES PATENTS 2,439,374     Leader et al.     Apr. 13, 1948
2,796,529     Morrison     June 18, 1957

OTHER REFERENCES

Mellor, "Comprehensive Treatise on Inorganic and Theoretical Chemistry," vol. 11 (1931), pages 400, 410; vol. 14 (1935), pages 689–691, Longmans, Green & Co.

Glasstone: "Sourcebook on Atomic Energy," D. Van Nostrand Co. (1950), pages 446, 463.

Zuber: "Chemical Effects of Neutron Capture in Some Cobaltic Hexamines" (NYO–6142), USAEC report dated June 11, 1954, pages 20–22, 24, 25, available from USAEC on Microcard.

"The Reactor Handbook, vol. 1, Physics" (AECD–3645), February 1955, pages 718–722.

Rockwell III, Reactor Shielding Design Manual, McGraw-Hill (1956), pages 2–11, and 175–177.

UNITED STATES PATENT OFFICE
CERTIFICATE OF CORRECTION

Patent No. 3,053,776                              September 11, 1962

Lyle B. Borst

It is hereby certified that error appears in the above numbered patent requiring correction and that the said Letters Patent should read as corrected below.

Column 4, line 52, after "pages 2-11," insert -- 42, --.

Signed and sealed this 19th day of March 1963.

(SEAL)
Attest:

ESTON G. JOHNSON
Attesting Officer

DAVID L. LADD
Commissioner of Patents